US012113244B2

(12) United States Patent
Koga

(10) Patent No.: US 12,113,244 B2
(45) Date of Patent: Oct. 8, 2024

(54) BATTERY

(71) Applicant: Panasonic Intellectual Property Management Co., Ltd., Osaka (JP)

(72) Inventor: Eiichi Koga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 725 days.

(21) Appl. No.: 17/343,644

(22) Filed: Jun. 9, 2021

(65) Prior Publication Data

US 2021/0305665 A1 Sep. 30, 2021

Related U.S. Application Data

(63) Continuation of application No. PCT/JP2019/045137, filed on Nov. 18, 2019.

(30) Foreign Application Priority Data

Dec. 28, 2018 (JP) .................... 2018-248599

(51) Int. Cl.
*H01M 50/572* (2021.01)
*H01M 10/0585* (2010.01)
(Continued)

(52) U.S. Cl.
CPC ..... *H01M 50/572* (2021.01); *H01M 10/0585* (2013.01); *H01M 50/103* (2021.01);
(Continued)

(58) Field of Classification Search
CPC .................... H01M 50/531; H01M 10/0562
See application file for complete search history.

(56) References Cited

U.S. PATENT DOCUMENTS 6,117,589 A 9/2000 Satou et al.
11,088,397 B2 * 8/2021 Kato ................ H01M 10/0565
(Continued)

FOREIGN PATENT DOCUMENTS

EP 4087001 A1 * 11/2022 ........ H01M 10/0525
JP 11-154502 6/1999
(Continued)

OTHER PUBLICATIONS

Translation of written opinion (no date) (Year: 0000).*
International Search Report of PCT application No. PCT/JP2019/045137 dated Feb. 18, 2020.

*Primary Examiner* — Amanda C. Walke
(74) *Attorney, Agent, or Firm* — Rimon P.C.

(57) ABSTRACT

A battery includes positive and negative electrode terminals, positive and negative electrode layers, a positive electrode current collector electrically connected to the positive electrode layer and the positive electrode terminal, a negative electrode current collector electrically connected to the negative electrode layer and the negative electrode terminal, a bipolar current collector positioned between the positive and negative electrode current collectors, a solid electrolyte layer positioned between the positive and negative electrode current collectors, and an insulating sealing member positioned between the positive and negative electrode current collectors and surrounding the solid electrolyte layer, wherein the positive electrode current collector and the negative electrode terminal are electrically isolated with a gap, the negative electrode current collector and the positive electrode terminal are electrically isolated with a gap, and the bipolar current collector is electrically isolated from the positive and negative electrode terminals with gaps.

11 Claims, 3 Drawing Sheets

(51) Int. Cl.
  *H01M 50/103* (2021.01)
  *H01M 50/531* (2021.01)
  *H01M 50/548* (2021.01)
  *H01M 50/553* (2021.01)
  *H01M 10/0562* (2010.01)

(52) U.S. Cl.
  CPC ....... *H01M 50/531* (2021.01); *H01M 50/548* (2021.01); *H01M 50/553* (2021.01); *H01M 10/0562* (2013.01)

(56) References Cited

U.S. PATENT DOCUMENTS

2010/0178554 A1  7/2010  Hama
2018/0212210 A1  7/2018  Suzuki

FOREIGN PATENT DOCUMENTS

| JP | 2005-310402 | 11/2005 |
| JP | 2009-032539 A | 2/2009 |
| JP | 2012-049067 | 3/2012 |
| JP | 2013-120717 | 6/2013 |
| JP | 2016-091634 | 5/2016 |
| JP | 2018-116917 A | 7/2018 |

\* cited by examiner

BATTERY

BACKGROUND

1. Technical Field

The present disclosure relates to a battery.

2. Description of the Related Art

A voltage and an output power of a battery can be increased by electrically connecting battery cells in series. As an example of techniques in relation to such series connection, Japanese Unexamined Patent Application Publication No. 2005-310402 discloses a bipolar battery including electrode tabs with which currents can be taken out from current collectors in laminated a plurality of single-cell layers. The electrode tabs are connected to the current collectors and are led out to the outside of the battery. Japanese Unexamined Patent Application Publication No. 2013-120717 discloses an all-solid-state battery in which terminal current collectors are attached to end surfaces of a laminate.

SUMMARY

In the related art, there are demands for further reduction in size of a battery and further improvement in reliability of the battery.

In one general aspect, the techniques disclosed here feature a battery including a positive electrode terminal and a negative electrode terminal; a positive electrode layer and a negative electrode layer; a positive electrode current collector electrically connected to each of the positive electrode layer and the positive electrode terminal; a negative electrode current collector electrically connected to each of the negative electrode layer and the negative electrode terminal; a bipolar current collector positioned between the positive electrode current collector and the negative electrode current collector; a solid electrolyte layer positioned between the positive electrode current collector and the negative electrode current collector; and an insulating sealing member positioned between the positive electrode current collector and the negative electrode current collector and surrounding the solid electrolyte layer, wherein the positive electrode current collector and the negative electrode terminal are electrically isolated from each other with a gap, the negative electrode current collector and the positive electrode terminal are electrically isolated from each other with a gap, and the bipolar current collector is electrically isolated from each of the positive electrode terminal and the negative electrode terminal with a gap.

The present disclosure can realize the battery that is suitable for size reduction and that has high reliability.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
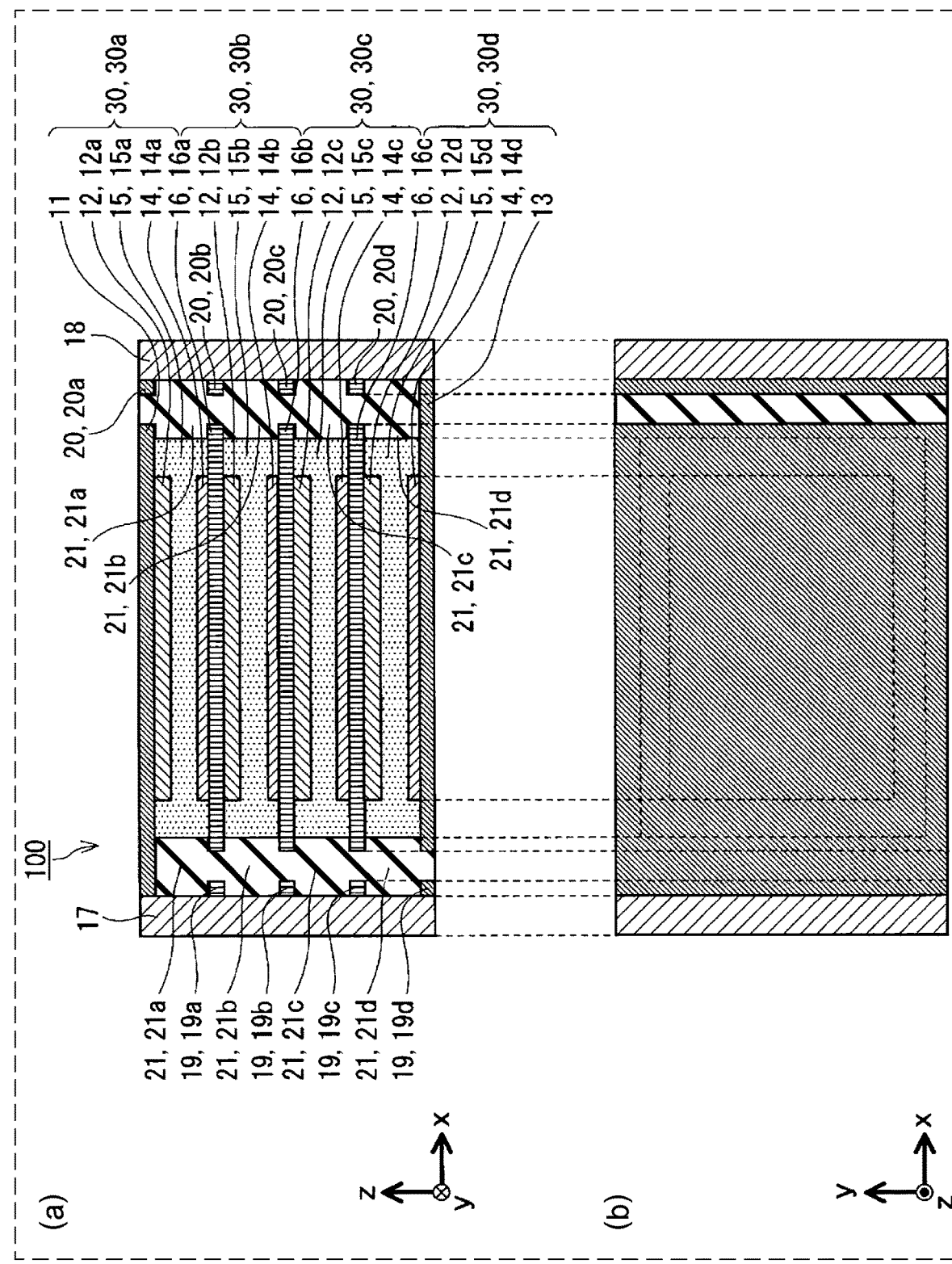
FIG. 1 illustrates a sectional view and a plan view schematically illustrating a structure of a battery according to a first embodiment.

Summary of Batteries According to Aspects of Present Disclosure

A battery according to a first aspect of the present disclosure includes:

- a positive electrode terminal and a negative electrode terminal;
- a positive electrode layer and a negative electrode layer;
- a positive electrode current collector electrically connected to each of the positive electrode layer and the positive electrode terminal;
- a negative electrode current collector electrically connected to each of the negative electrode layer and the negative electrode terminal;
- a bipolar current collector positioned between the positive electrode current collector and the negative electrode current collector;
- a solid electrolyte layer positioned between the positive electrode current collector and the negative electrode current collector; and
- an insulating sealing member positioned between the positive electrode current collector and the negative electrode current collector and surrounding the solid electrolyte layer, wherein the positive electrode current collector and the negative electrode terminal are electrically isolated from each other with a gap, the negative electrode current collector and the positive electrode terminal are electrically isolated from each other with a gap, and the bipolar current collector is electrically isolated from each of the positive electrode terminal and the negative electrode terminal with a gap.

With the first aspect, there is no necessity of directly connecting wirings or electrode tabs to take out currents from the current collectors and leading out the wirings or the electrode tabs to the outside of the battery. Hence the battery according to the first aspect is suitable for size reduction. As a result, the battery with a high energy density and a large capacity can be realized. Furthermore, in each of a plurality of cells, the positive electrode current collector and the negative electrode terminal are electrically isolated from each other with the gap, and the negative electrode current collector and the positive electrode terminal are electrically isolated from each other with the gap. Moreover, the bipolar current collector is electrically isolated from each of the positive electrode terminal and the negative electrode terminal with the gap. As a result, the battery according to the first aspect has high reliability.

According to a second aspect, for example, the battery according to the first aspect may further include a first anchor member connected to the positive electrode terminal and electrically isolated from each of the negative electrode current collector and the bipolar current collector with a gap, and a second anchor member connected to the negative electrode terminal and electrically isolated from each of the positive electrode current collector and the bipolar current collector with a gap. With the second aspect, the battery includes the anchor members. Because of the presence of the anchor members, even when, for example, external stress such as mechanical stress or cooling-heating is applied to the battery, the positive electrode terminal and the negative electrode terminal are less likely to detach from the battery. Thus, the anchor members make it possible to reduce a possibility of a connection failure in the battery and to increase the reliability of the battery.

According to a third aspect, for example, in the battery according to the second aspect, part of the first anchor member may be embedded in the positive electrode terminal, or part of the second anchor member may be embedded in the negative electrode terminal. With the third aspect, reliability of connections between the positive electrode current collector and the positive electrode terminal and between the negative electrode current collector and the negative electrode terminal can be increased.

According to a fourth aspect, for example, in the battery according to the third aspect, a portion of the first anchor member ranging from an end of the first anchor member through a distance of longer than or equal to 1 μm may be embedded in the positive electrode terminal, or a portion of the second anchor member ranging from an end of the second anchor member through a distance of longer than or equal to 1 μm may be embedded in the negative electrode terminal. With the fourth aspect, the reliability of the connections between the positive electrode current collector and the positive electrode terminal and between the negative electrode current collector and the negative electrode terminal can be further increased.

According to a fifth aspect, for example, in the battery according to any one of the first to fourth aspects, the positive electrode terminal may cover a principal surface of the positive electrode current collector, or the negative electrode terminal may cover a principal surface of the negative electrode current collector. With the fifth aspect, strength in joining components of the battery together can be increased.

According to a sixth aspect, for example, in the battery according to any one of the first to fifth aspects, part of the positive electrode current collector may be embedded in the positive electrode terminal, or part of the negative electrode current collector may be embedded in the negative electrode terminal. With the sixth aspect, the reliability of the connections between the positive electrode current collector and the positive electrode terminal and between the negative electrode current collector and the negative electrode terminal can be increased.

According to a seventh aspect, for example, in the battery according to the sixth aspect, a portion of the positive electrode current collector ranging from an end of the positive electrode current collector through a distance of longer than or equal to 1 μm may be embedded in the positive electrode terminal, or a portion of the negative electrode current collector ranging from an end of the negative electrode current collector through a distance of longer than or equal to 1 μm may be embedded in the negative electrode terminal. With the seventh aspect, the reliability of the connections between the positive electrode current collector and the positive electrode terminal and between the negative electrode current collector and the negative electrode terminal can be further increased.

According to an eighth aspect, for example, in the battery according to any one of the first to seventh aspects, the positive electrode current collector may be electrically connected to the positive electrode terminal with a first alloy, or the negative electrode current collector may be electrically connected to the negative electrode terminal with a second alloy. With the eighth aspect, the reliability of the electrical connections between the positive electrode current collector and the positive electrode terminal and between the negative electrode current collector and the negative electrode terminal can be increased.

Embodiments will be described in detail below with reference to the drawings.

It is to be noted that each of the following embodiments represents a generic or specific example. Numerical values, shapes, materials, components, arrangement positions and connection forms of the components, and so on, which are described in the following embodiments, are merely illustrative, and they are not purported to limit the present disclosure. Among the components in the following embodiments, those ones not stated in the independent claim defining the most significant concept are described as optional components.

The drawings are not always exactly drawn in a strict sense. In the drawings, substantially the same components are denoted by the same reference signs, and duplicate description is omitted or simplified.

First Embodiment

Summary of Multilayer Battery

First, a battery according to a first embodiment is described.

FIG. 1 is a schematic view illustrating a structure of a battery 100 according to the first embodiment. In this embodiment, the battery 100 is a multilayer battery. In this specification, therefore, the "battery 100" is also called a "multilayer battery 100". FIG. 1(a) is a sectional view of the battery 100 according to this embodiment. FIG. 1(b) is a plan view of the battery 100.

As illustrated in FIG. 1(a), the battery 100 includes a plurality of cells 30, a positive electrode terminal 17, and a negative electrode terminal 18. In this specification, the "cell" is also called a "solid-state battery cell". The plurality of cells 30 are electrically connected in series. As illustrated in FIG. 1(b), each of the plurality of cells 30 has, for example, a rectangular shape in a plan view. Each cell 30 has two pairs of end surfaces, each pair of the end surfaces being opposite to each other. The plurality of cells 30 are laminated in the battery 100. In this embodiment, a first direction x is a direction from one of one pair of the end surfaces of one particular cell 30 to the other end surface. A second direction y is a direction from one of the other pair of the end surfaces of the one particular cell 30 to the other end surface and is perpendicular to the first direction x. A third direction z is a direction in which the plurality of cells 30 are laminated, and is perpendicular to each of the first direction x and the second direction y.

The number of the plurality of cells 30 is not limited to a particular value and may be more than or equal to 2 and less than or equal to 100, or more than or equal to 2 and less than or equal to 10. In some cases, the number of the plurality of cells 30 may be more than or equal to 20 and less than or equal to 100. In this embodiment, the battery 100 includes a plurality of cells 30a, 30b, 30c and 30d. The plurality of cells 30a, 30b, 30c and 30d are laminated in the mentioned order.

The positive electrode terminal 17 and the negative electrode terminal 18 are each electrically connected to a laminate of the plurality of cells 30. Each of the positive electrode terminal 17 and the negative electrode terminal 18 has, for example, a plate-like shape. The positive electrode terminal 17 and the negative electrode terminal 18 are opposite to each other. The positive electrode terminal 17 and the negative electrode terminal 18 are arranged with an interval in the first direction x. The plurality of cells 30 are positioned between the positive electrode terminal 17 and the negative electrode terminal 18. A surface of each of the positive electrode terminal 17 and the negative electrode terminal 18 is not coated with an insulating layer, for example. In this specification, the positive electrode terminal 17 and the negative electrode terminal 18 are simply also called "terminals".

The battery 100 includes, as components constituting the plurality of cells 30, a positive electrode current collector 11, a positive electrode layer 12, a negative electrode current collector 13, a negative electrode layer 14, a solid electrolyte layer 15, and a bipolar current collector 16. In this specification, the "bipolar current collector" implies a current collector with both of a function as the positive electrode current collector and a function of the negative electrode current collector. In this specification, the positive electrode current collector 11, the negative electrode current collector 13, and the bipolar current collector 16 are simply also called "current collectors".

The positive electrode current collector 11 is positioned at, for example, an upper end of the battery 100. The positive electrode current collector 11 constitutes part of an upper surface of the battery 100. The positive electrode current collector 11 has, for example, a plate-like shape. The positive electrode current collector 11 is electrically connected to each of the positive electrode layer 12 and the positive electrode terminal 17. The positive electrode current collector 11 may be in direct contact with each of the positive electrode layer 12 and the positive electrode terminal 17. For example, a principal surface of the positive electrode current collector 11 may be in direct contact with the positive electrode layer 12. The term "principal surface" implies one of surfaces of the positive electrode current collector 11, the one surface having a maximum area. An end surface of the positive electrode current collector 11 may be in direct contact with the positive electrode terminal 17. The positive electrode current collector 11 and the negative electrode terminal 18 are electrically isolated from each other with a gap. A shortest distance between the positive electrode current collector 11 and the negative electrode terminal 18 is not limited to a particular value and may be longer than or equal to 1 μm and shorter than or equal to 100 μm, or longer than or equal to 1 μm and shorter than or equal to 10 μm. In some cases, the shortest distance between the positive electrode current collector 11 and the negative electrode terminal 18 may be longer than or equal to 20 μm and shorter than or equal to 100 μm. In this embodiment, the cell 30a positioned on an outermost side among the plurality of cells 30 includes the positive electrode current collector 11. In this specification, a region near the end surface of the cell 30 is also called an "end region" of the cell 30. The positive electrode current collector 11 and the negative electrode terminal 18 are electrically isolated from each other with the gap, for example, in the end region of the cell 30a.

The negative electrode current collector 13 is positioned at, for example, a lower end of the battery 100. The negative electrode current collector 13 constitutes part of a lower surface of the battery 100. The negative electrode current collector 13 has, for example, a plate-like shape. The negative electrode current collector 13 is electrically connected to each of the negative electrode layer 14 and the negative electrode terminal 18. The negative electrode current collector 13 may be in direct contact with each of the negative electrode layer 14 and the negative electrode terminal 18.

For example, a principal surface of the negative electrode current collector 13 may be in direct contact with the negative electrode layer 14. An end surface of the negative electrode current collector 13 may be in direct contact with the negative electrode terminal 18. The negative electrode current collector 13 and the positive electrode terminal 17 are electrically isolated from each other with a gap. A shortest distance between the negative electrode current collector 13 and the positive electrode terminal 17 is not limited to a particular value and may be longer than or equal to 1 μm and shorter than or equal to 100 μm, or longer than or equal to 1 μm and shorter than or equal to 10 μm. In some cases, the shortest distance between the negative electrode current collector 13 and the positive electrode terminal 17 may be longer than or equal to 20 μm and shorter than or equal to 100 μm. In this embodiment, the cell 30d positioned on an outermost side among the plurality of cells 30 includes the negative electrode current collector 13. The negative electrode current collector 13 and the positive electrode terminal 17 are electrically isolated from each other with the gap, for example, in the end region of the cell 30d.

The positive electrode current collector 11 and the negative electrode current collector 13 are opposite to each other. The positive electrode current collector 11 and the negative electrode current collector 13 are arranged with an interval in the third direction z. A position of the negative electrode current collector 13 is deviated from that of the positive electrode current collector 11 in the first direction x, for example. In a pan view, for example, the gap between the negative electrode current collector 13 and the positive electrode terminal 17 does not overlap with the gap between the positive electrode current collector 11 and the negative electrode terminal 18.

The bipolar current collector 16 is positioned between the positive electrode current collector 11 and the negative electrode current collector 13. The bipolar current collector 16 has, for example, a plate-like shape. The bipolar current collector 16 is electrically connected to each of the positive electrode layer 12 and the negative electrode layer 14. Thus, the bipolar current collector 16 has both of the function as the positive electrode current collector and the function as the negative electrode current collector. The bipolar current collector 16 may be in direct contact with each of the positive electrode layer 12 and the negative electrode layer 14. For example, a first principal surface of the bipolar current collector 16 may be in direct contact with the positive electrode layer 12. A second principal surface of the bipolar current collector 16 may be in direct contact with the negative electrode layer 14. In the bipolar current collector 16, the first principal surface and the second principal surface are opposite to each other. The bipolar current collector 16 is electrically isolated from each of the positive electrode terminal 17 and the negative electrode terminal 18 with a gap. A shortest distance between the bipolar current collector 16 and each of the positive electrode terminal 17 and the negative electrode terminal 18 is not limited to a particular value and may be longer than or equal to 1 μm and shorter than or equal to 100 μm, or longer than or equal to 1 μm and shorter than or equal to 10 μm. In some cases, the shortest distance between the bipolar current collector 16 and each of the positive electrode terminal 17 and the negative electrode terminal 18 may be longer than or equal to 20 μm and shorter than or equal to 100 μm. The bipolar current collector 16 is electrically isolated from each of the positive electrode terminal 17 and the negative electrode terminal 18 with the gap, for example, in the end region of the cell 30.

The battery 100 may include a plurality of bipolar current collectors 16. The number of the bipolar current collectors 16 is not limited to a particular value and may be more than or equal to 1 and less than or equal to 99, or more than or equal to 1 and less than or equal to 9. In some cases, the number of the bipolar current collectors 16 may be more than or equal to 19 and less than or equal to 99. In this embodiment, the battery 100 includes a plurality of bipolar current collectors 16a, 16b and 16c. The bipolar current collectors 16a, 16b and 16c are arrayed in the mentioned order successively in a direction opposite to the third direction z. The bipolar current collector 16a is shared by the cells 30a and 30b. The bipolar current collector 16b is shared by the cells 30b and 30c. The bipolar current collector 16c is shared by the cells 30c and 30d. The bipolar current collectors 16a, 16b and 16c function as the negative electrode current collectors in the cells 30a, 30b and 30c, respectively. The bipolar current collectors 16a, 16b and 16c function as the positive electrode current collectors in the cells 30b, 30c and 30d, respectively.

The positive electrode layer 12 has, for example, a rectangular shape in a plan view. The positive electrode layer 12 is arranged on the positive electrode current collector 11 or the bipolar current collector 16. The positive electrode layer 12 partly covers, for example, a principal surface of the positive electrode current collector 11 or a principal surface of the bipolar current collector 16. The positive electrode layer 12 may cover a region including the centroid of the principal surface of the positive electrode current collector 11 or a region including the centroid of the principal surface of the bipolar current collector 16. For example, the positive electrode layer 12 is not formed in the end region of the cell 30. In this embodiment, the cells 30a, 30b, 30c and 30d include respectively positive electrode layers 12a, 12b, 12c and 12d. The positive electrode layer 12a is arranged on the positive electrode current collector 11. The positive electrode layers 12b, 12c and 12d are arranged respectively on the bipolar current collectors 16a, 16b and 16c.

The negative electrode layer 14 has, for example, a rectangular shape in a plan view. The negative electrode layer 14 is arranged on the negative electrode current collector 13 or the bipolar current collector 16. The negative electrode layer 14 partly covers, for example, a principal surface of the negative electrode current collector 13 or a principal surface of the bipolar current collector 16. The negative electrode layer 14 may cover a region including the centroid of the principal surface of the negative electrode current collector 13 or a region including the centroid of the principal surface of the bipolar current collector 16. For example, the negative electrode layer 14 is not formed in the end region of the cell 30. In this embodiment, the cells 30a, 30b, 30c and 30d include respectively negative electrode layers 14a, 14b, 14c and 14d. The negative electrode layers 14a, 14b and 14c are arranged respectively on the bipolar current collectors 16a, 16b and 16c. The negative electrode layer 14d is arranged on the negative electrode current collector 13.

The solid electrolyte layer 15 has, for example, a rectangular shape in a plan view. The solid electrolyte layer 15 is positioned between the positive electrode current collector 11 and the negative electrode current collector 13. The battery 100 includes, for example, a plurality of solid electrolyte layers 15. The number of the plurality of solid electrolyte layers 15 is, for example, the same as that of the plurality of cells 30. In this embodiment, the cells 30a, 30b, 30c and 30d include respectively solid electrolyte layers 15a, 15b, 15c and 15d. The solid electrolyte layers 15a, 15b, 15c and 15d and the bipolar current collectors 16a, 16b and 16c are alternately arrayed successively in the third direction z. The solid electrolyte layer 15a is positioned between the positive electrode layer 12a and the negative electrode layer 14a. The solid electrolyte layer 15b is positioned between the positive electrode layer 12b and the negative electrode layer 14b. The solid electrolyte layer 15c is positioned between the positive electrode layer 12c and the negative electrode layer 14c. The solid electrolyte layer 15d is positioned between the positive electrode layer 12d and the negative electrode layer 14d. The solid electrolyte layers 15a, 15b, 15c and 15d may be in contact with the positive electrode layers 12a, 12b, 12c and 12d, respectively. The solid electrolyte layers 15a, 15b, 15c and 15d may be in contact with the negative electrode layers 14a, 14b, 14c and 14d, respectively.

The battery 100 further includes an insulating sealing member 21. The sealing member 21 is positioned between the positive electrode current collector 11 and the negative electrode current collector 13. The sealing member 21 surrounds the solid electrolyte layer 15. In other words, the sealing member 21 is positioned on an outer side than the solid electrolyte layer 15 in a plan view. The sealing member 21 may be in contact with the solid electrolyte layer 15. In more detail, the sealing member 21 may be in contact with an entire lateral surface of the solid electrolyte layer 15. The sealing member 21 may be in contact with each of the positive electrode terminal 17 and the negative electrode terminal 18.

The battery 100 includes, for example, a plurality of sealing members 21. The number of the plurality of sealing members 21 is, for example, the same as that of the plurality of cells 30. In this embodiment, the cells 30a, 30b, 30c, and 30d include respectively sealing members 21a, 21b, 21c and 21d. The sealing member 21a may be in contact with the sealing member 21b in a gap between the bipolar current collector 16a and the positive electrode terminal 17 and a gap between the bipolar current collector 16a and the negative electrode terminal 18.

The sealing member 21b may be in contact with the sealing member 21c in a gap between the bipolar current collector 16b and the positive electrode terminal 17 and a gap between the bipolar current collector 16b and the negative electrode terminal 18. The sealing member 21c may be in contact with the sealing member 21d in a gap between the bipolar current collector 16c and the positive electrode terminal 17 and a gap between the bipolar current collector 16c and the negative electrode terminal 18.

The sealing member 21a may be in contact with each of the positive electrode current collector 11 and the bipolar current collector 16a. Part of the bipolar current collector 16a may be embedded in the sealing member 21a. The sealing member 21b may be in contact with each of the bipolar current collectors 16a and 16b. Part of the bipolar current collector 16a and part of the bipolar current collector 16b may be embedded in the sealing member 21b. The sealing member 21c may be in contact with each of the bipolar current collectors 16b and 16c. Part of the bipolar current collector 16b and part of the bipolar current collector 16c may be embedded in the sealing member 21c. The sealing member 21d may be in contact with each of the negative electrode current collector 13 and the bipolar current collector 16c. Part of the bipolar current collector 16c may be embedded in the sealing member 21d.

With the above-described feature, adjacent two of the current collectors 11, 13 and 16 can be suppressed from contacting with each other and from causing a short circuit. The positive electrode current collector 11 and the negative electrode terminal 18 can be suppressed from contacting with each other and from causing a short circuit. The negative electrode current collector 13 and the positive electrode terminal 17 can be suppressed from contacting with each other and from causing a short circuit. The bipolar current collector 16 and the positive electrode terminal 17 or the negative electrode terminal 18 can be suppressed from contacting with each other and from causing a short circuit. With the presence of the sealing member 21, the solid electrolyte layer 15 being apt to deteriorate with water and so on can be shut off from external environments. It is hence possible to increase environmental resistance of the multilayer battery 100 with a high energy density, high reliability, a high voltage, and a high output power.

The battery 100 further includes, for example, a first anchor member 19 and a second anchor member 20. In this specification, the first anchor member 19 and the second anchor member 20 are simply also called "anchor members". The first anchor member 19 is connected to the positive electrode terminal 17 and is electrically isolated from each of the negative electrode current collector 13 and the bipolar current collector 16 with a gap. The first anchor member 19 may be in direct contact with the positive electrode terminal 17. The battery 100 includes, for example, a plurality of first anchor members 19. The number of the plurality of first anchor members 19 is, for example, the same as that of the plurality of cells 30. In this embodiment, the battery 100 includes first anchor members 19a, 19b, 19c and 19d. The first anchor member 19a is shared by the cells 30a and 30b. The first anchor member 19b is shared by the cells 30b and 30c. The first anchor member 19c is shared by the cells 30c and 30d. The first anchor member 19d is included in the cell 30d. The first anchor members 19a, 19b and 19c may be arranged to be in line with, respectively, the bipolar current collectors 16a, 16b and 16c in the first direction x. A shortest distance between the first anchor member 19a and the bipolar current collector 16a, a shortest distance between the first anchor member 19b and the bipolar current collector 16b, and a shortest distance between the first anchor member 19c and the bipolar current collector 16c are each not limited to a particular value and may be longer than or equal to 1 µm and shorter than or equal to 20 µm, or longer than or equal to 1 µm and shorter than or equal to 5 µm. In some cases, those shortest distances may be each longer than or equal to 10 µm and shorter than or equal to 20 µm. The first anchor member 19d may be arranged to be in line with the negative electrode current collector 13 in the first direction x. A shortest distance between the first anchor member 19d and the negative electrode current collector 13 is not limited to a particular value and may be longer than or equal to 1 µm and shorter than or equal to 20 µm, or longer than or equal to 1 µm and shorter than or equal to 5 µm. In some cases, the shortest distance between the first anchor member 19d and the negative electrode current collector 13 may be longer than or equal to 10 µm and shorter than or equal to 20 µm. The first anchor members 19a, 19b, 19c and 19d may be in contact with the sealing members 21a, 21b, 21c and 21d or may be embedded in the sealing members 21a, 21b, 21c and 21d, respectively.

The second anchor member 20 is connected to the negative electrode terminal 18 and is electrically isolated from each of the positive electrode current collector 11 and the bipolar current collector 16 with a gap. The second anchor member 20 may be in direct contact with the negative electrode terminal 18. The battery 100 includes, for example, a plurality of second anchor members 20. The number of the plurality of second anchor members 20 is, for example, the same as that of the plurality of cells 30. In this embodiment, the battery 100 includes second anchor members 20a, 20b, 20c and 20d. The second anchor member 20a is included in the cell 30a. The second anchor member 20b is shared by the cells 30a and 30b. The second anchor member 20c is shared by the cells 30b and 30c. The second anchor member 20d is shared by the cells 30c and 30d. The second anchor member 20a may be arranged to be in line with the positive electrode current collector 11 in the first direction x. A shortest distance between the second anchor member 20a and the positive electrode current collector 11 is not limited to a particular value and may be longer than or equal to 1 µm and shorter than or equal to 20 µm, or longer than or equal to 1 µm and shorter than or equal to 5 µm. In some cases, the shortest distance between the second anchor member 20a and the positive electrode current collector 11 may be longer than or equal to 10 µm and shorter than or equal to 20 µm. The second anchor members 20b, 20c and 20d may be arranged to be in line with, respectively, the bipolar current collectors 16a, 16b and 16c in the first direction x. A shortest distance between the second anchor member 20b and the bipolar current collector 16a, a shortest distance between the second anchor member 20c and the bipolar current collector 16b, and a shortest distance between the second anchor member 20d and the bipolar current collector 16c are each not limited to a particular value and may be longer than or equal to 1 µm and shorter than or equal to 20 µm, or longer than or equal to 1 µm and shorter than or equal to 5 µm. In some cases, those shortest distances may be each longer than or equal to 10 µm and shorter than or equal to 20 µm. The second anchor members 20a, 20b, 20c and 20d may be in contact with the sealing members 21a, 21b, 21c and 21d or may be embedded in the sealing members 21a, 21b, 21c and 21d, respectively.

The first anchor member 19 and the second anchor member 20 are basically positioned in a region where those anchor members do not affect power generating elements of the battery 100. The region where the power generating elements of the battery 100 are not affected by the anchor members implies, for example, a region of the battery 100 except for a region surrounded by the positive electrode layer 12 and the negative electrode layer 14. The first anchor member 19 and the second anchor member 20 are embedded, for example, in the solid electrolyte layer 15.

With the above-described feature, the positive electrode terminal 17 and the negative electrode terminal 18 can connect the plurality of cells 30 in series in an integrated structure without affecting battery characteristics of the cells 30 and volumes of the cells 30. Inside the multilayer battery 100, therefore, the positive electrode terminal 17 and the negative electrode terminal 18 are rigidly joined to the positive electrode current collector 11 and the negative electrode current collector 13, respectively. Hence a voltage and an output power of the battery 100 can be increased. In other words, the multilayer battery 100 can be realized which has a small shape, which exhibits shock resistance, which can increase reliability against stress attributable to flexing of the current collectors 11 and 13, and which has a high energy density, high reliability, a high voltage, and a high output power.

Furthermore, the sealing member 21 is integrated with the terminals and the anchor members and functions as a shock buffer layer. Since the shock buffer layer protects each power generating element inside the battery 100, the shock resistance of the battery 100 is further increased. The sealing member 21 may be positioned outside the power generating elements. The wording "outside the power generating element" implies a portion of the cell 30 causing no influences on electrical characteristics; namely, for example, a portion outside the region surrounded by the positive electrode layer 12 and the negative electrode layer 14. However, the sealing member 21 may be positioned inside the power generating element for the purpose of preventing a short circuit in the cell 30 and increasing the shock resistance. The wording "inside the power generating element" implies, for example, a portion within the region surrounded by the positive electrode layer 12 and the negative electrode layer 14.

The first anchor member 19 and the second anchor member 20 are positioned, for example, in a region of the cell 30 where those anchor members do not affect the power generating element. However, insofar as the influence falls within an allowable characteristic change of the battery 100, the anchor members 19 and 20 may be positioned within the power generating element for the purpose of blocking off the cell 30 from the outside and increasing protection performance. In the first anchor member 19 and the second anchor member 20, their surfaces in contact with the solid electrolyte layer 15 or the sealing member 21 may be subjected to surface roughing or may be processed to form irregularities or bent portions as required. Holes may be formed in the surfaces of the anchor members 19 and 20. In such a case, gripping performance of the anchor members 19 and 20 with respect to the solid electrolyte layer 15 or the sealing member 21 can be increased. Hence the shock resistance of the battery 100 can be further increased. Thus, the multilayer battery 100 with higher reliability can be obtained by increasing anchoring effects due to the first anchor member 19 and the second anchor member 20. The first anchor member 19 and the second anchor member 20 exhibit high thermal conductivity because of having electrical conductivity. Accordingly, the anchor members 19 and 20 can further provide an effect of dissipating heat generated inside the multilayer battery 100 to the outside of the power generating elements through the terminals 17 and 18. As a result, it is possible to suppress deterioration of a service life, which is attributable to operation under a high-temperature condition and which may be actually caused in a battery designed with intent to increase a voltage and an output power.

In the battery 100, the positive electrode current collector 11 may be electrically connected to the positive electrode terminal 17 with a first alloy. The first alloy includes, for example, a material of the positive electrode current collector 11 and a material of the positive electrode terminal 17. The first alloy is formed, for example, by mixing of a metal contained in the positive electrode current collector 11 and a metal contained in the positive electrode terminal 17 at an interface between the positive electrode current collector 11 and the positive electrode terminal 17. In this specification, a region where the first alloy is formed is also called a "first alloy portion" or a "first diffusion layer". When the positive electrode current collector 11 and the positive electrode terminal 17 are integrated with each other through the first diffusion layer, reliability of electrical connections in the battery 100 against heat shock and vibration is increased in comparison with the case of joining the positive electrode current collector 11 and the positive electrode terminal 17 based on the anchoring effect. Thus, the first alloy portion increases connection strength between the positive electrode current collector 11 and the positive electrode terminal 17. With the first alloy being diffused into the surrounding components from the first alloy portion, the connection strength between the positive electrode current collector 11 and the positive electrode terminal 17 is further increased.

In the battery 100, the negative electrode current collector 13 may be electrically connected to the negative electrode terminal 18 with a second alloy. The second alloy includes, for example, a material of the negative electrode current collector 13 and a material of the negative electrode terminal 18. The second alloy is formed, for example, by mixing of a metal contained in the negative electrode current collector 13 and a metal contained in the negative electrode terminal 18 at an interface between the negative electrode current collector 13 and the negative electrode terminal 18. In this specification, a region where the second alloy is formed is also called a "second alloy portion" or a "second diffusion layer". When the negative electrode current collector 13 and the negative electrode terminal 18 are integrated with each other through the second diffusion layer, the reliability of the electrical connections in the battery 100 against heat shock and vibration is increased in comparison with the case of joining the negative electrode current collector 13 and the negative electrode terminal 18 based on the anchoring effect. Thus, the second alloy portion increases connection strength between the negative electrode current collector 13 and the negative electrode terminal 18. With the second alloy being diffused into the surrounding components from the second alloy portion, the connection strength between the negative electrode current collector 13 and the negative electrode terminal 18 is further increased.

In the battery 100, the first anchor member 19 may be connected to the positive electrode terminal 17 with a third alloy. The third alloy includes, for example, a material of the first anchor member 19 and the material of the positive electrode terminal 17. The third alloy is formed, for example, by mixing of a metal contained in the first anchor member 19 and the metal contained in the positive electrode terminal 17 at an interface between the first anchor member 19 and the positive electrode terminal 17. In this specification, a region where the third alloy is formed is also called a "third alloy portion" or a "third diffusion layer". Thus, the third alloy portion increases connection strength between the first anchor member 19 and the positive electrode terminal 17.

In the battery 100, the second anchor member 20 may be connected to the negative electrode terminal 18 with a fourth alloy. The fourth alloy includes, for example, a material of the second anchor member 20 and a material of the negative electrode terminal 18. The fourth alloy is formed, for example, by mixing of a metal contained in the second anchor member 20 and the metal contained in the negative electrode terminal 18 at an interface between the second anchor member 20 and the negative electrode terminal 18. In this specification, a region where the fourth alloy is formed is also called a "fourth alloy portion" or a "fourth diffusion layer". Thus, the fourth alloy portion increases connection strength between the second anchor member 20 and the negative electrode terminal 18.

With the above-described feature, the battery 100 with a high voltage, a high output power, a high energy density, and high reliability can be provided by rigidly integrating the plurality of cells 30 electrically connected in series while reducing the battery size.

Stated in another way, with the above-described feature, the integrated and series-connected multilayer battery can be obtained with no necessity of connecting, to the current collectors 11 and 13, wirings or electrode tabs to take out currents from the current collectors 11 and 13 and leading out the wirings or the electrode tabs to the outside of the battery 100. Furthermore, since the plurality of cells 30 connected in series can be rigidly integrated due to the presence of the anchor members 19 and 20 while reducing the battery size, the battery 100 with a high voltage, a high output power, a high energy density, and high reliability can be realized.

Detailed Structure of Multilayer Battery

The individual components of the battery 100 will be described in more detail below.

First, the individual component of the multilayer battery 100 according to an embodiment of the present disclosure are described.

The positive electrode layer 12 functions as a positive-electrode active substance layer containing a positive electrode active substance. The positive electrode layer 12 may contain, as a main ingredient, the positive electrode active substance. The main ingredient implies an ingredient that is contained in the positive electrode layer 12 with a maximum ratio by weight. The positive electrode active substance implies a substance that is oxidized or reduced with association or dissociation of a metal ion, such as a lithium (Li) ion or a magnesium (Mg) ion, into or from a crystal structure of the substance at a higher potential than with respect to a negative electrode, whereby oxidation or reduction takes place. The type of the positive electrode active substance can be selected as appropriate depending on the type of the battery, and known positive electrode active substances can be used. The positive electrode active substance is given as a compound containing lithium and a transition metal element. Examples of such a compound include an oxide containing lithium and a transition metal element, and a phosphate compound containing lithium and a transition metal element. The oxide containing lithium and a transition metal element is given as, for example, any of lithium-nickel complex oxides such as $LiNi_xM_{1-x}O_2$ (M denotes at least one element selected from the group consisting of Co, Al, Mn, V, Cr, Mg, Ca, Ti, Zr, Nb, Mo and W, and x satisfies $0<x\leq1$), layered oxides such as a lithium cobalt oxide ($LiCoO_2$), a lithium nickel oxide ($LiNiO_2$), and a lithium manganese oxide ($LiMn_2O_4$), and lithium manganese oxides ($LiMn_2O_4$, $Li_2MnO_3$, and $LiMnO_2$) with a spinel structure. The phosphate compound containing lithium and a transition metal element may be given as, for example, a lithium iron phosphate ($LiFePO_4$) with an olivine structure. Furthermore, the positive electrode active substance may be given as, for example, sulfur (S) or a sulfide such as a lithium sulfide ($Li_2S$). The positive electrode active substance may be given as a material obtained by coating or adding, for example, a lithium niobate ($LiNbO_3$) on or to sulfide-containing particles. Only one type or a combination of two or more types among the above-mentioned materials may be used as the positive electrode active substance.

As described above, the material of the positive electrode layer 12 is not limited to a particular one insofar as containing the positive electrode active substance. The positive electrode layer 12 may be a mixture layer formed by a mixture of the positive electrode active substance and another additive material. The other additive material may be given as, for example, a solid electrolyte such as an inorganic solid electrolyte, a conductive aid such as acetylene black, or a binding agent (binder) such as a polyethylene oxide or a polyvinylidene fluoride. Not only lithium-ion conductivity, but also electron conductivity in the positive electrode layer 12 can be increased by mixing the positive electrode active substance and the other additive material at a predetermined ratio in the positive electrode layer 12.

A thickness of the positive electrode layer 12 is, for example, more than or equal to 5 μm and less than or equal to 300 μm.

The negative electrode layer 14 functions as a negative-electrode active substance layer containing a negative electrode material such as a negative electrode active substance. The negative electrode layer 14 may contain, as a main ingredient, the negative electrode active material. The negative electrode active substance implies a substance that is oxidized or reduced with association or dissociation of a metal ion, such as a lithium (Li) ion or a magnesium (Mg) ion, into or from a crystal structure of the substance at a lower potential than with respect to a positive electrode, whereby oxidation or reduction takes place. The type of the negative electrode active substance can be selected as appropriate depending on the type of the battery, and known negative electrode active substances can be used. The negative electrode active substance may be given as, for example, any of carbon materials such as natural graphite, artificial graphite, graphite carbon fiber, and resin-fired carbon, and alloy-based materials to be mixed with the solid electrolyte. The alloy-based materials may be given as, for example, lithium alloys such as LiAl, LiZn, $Li_3Bi$, $Li_3Cd$, $Li_3Sb$, $Li_4Si$, $Li_{4.4}Pb$, $Li_{4.4}Sn$, $Li_{0.17}C$, and $LiC_6$, a compound containing lithium and an oxide of a transition metal element, such as a lithium titanate ($Li_4Ti_5O_{12}$), and metal oxides such as a zinc oxide (ZnO) and a silicon oxide ($SiO_x$). Only one type or a combination of two or more types among the above-mentioned materials may be used as the negative electrode active substance.

As described above, the material of the negative electrode layer 14 is not limited to a particular one insofar as containing the negative electrode active substance. The negative electrode layer 14 may be a mixture layer formed by a mixture of the negative electrode active substance and another additive material. The other additive material may be given as, for example, a solid electrolyte such as an inorganic solid electrolyte, a conductive aid such as acetylene black, or a binder such as a polyethylene oxide or a polyvinylidene fluoride. Not only lithium-ion conductivity, but also electron conductivity in the negative electrode layer 14 can be increased by mixing the negative electrode active substance and the other additive material at a predetermined ratio in the negative electrode layer 14.

A thickness of the negative electrode layer 14 is, for example, more than or equal to 5 μm and less than or equal to 300 μm.

The solid electrolyte layer 15 contains a solid electrolyte. The solid electrolyte is not limited to a particular one insofar as ion conductivity is obtained, and known electrolytes for batteries can be used. The solid electrolyte may be given as an electrolyte that conducts a metal ion such as a Li ion or Mg ion, for example. The solid electrolyte can be selected as appropriate depending on the species of the ion to be conducted. The solid electrolyte may be given as, for example, an inorganic solid electrolyte such as a sulfide solid electrolyte or an oxide solid electrolyte. The sulfide solid electrolyte may be given as, for example, a lithium-containing sulfide such as $Li_2S$—$P_2S_5$, $Li_2S$—$SiS_2$, $Li_2S$—$B_2S_3$, $Li_2S$—$GeS_2$, $Li_2S$—$SiS_2$—LiI, $Li_2S$—$SiS_2$—$Li_3PO_4$, $Li_2S$—$Ge_2S_2$, $Li_2S$—$GeS_2$—$P_2S_5$, or $Li_2S$—$GeS_2$—ZnS. The oxide solid electrolyte may be given as, for example, a lithium-containing metal oxide such as $Li_2O$—$SiO_2$ or $Li_2O$—$SiO_2$—$P_2O_5$, a lithium-containing metal nitride such as $Li_xP_yO_{1-z}N_z$, lithium phosphate ($Li_3PO_4$), and a lithium-containing transition metal oxide such as a lithium titanium oxide. Only one type or a combination of two or more types among the above-mentioned materials may be used as the solid electrolyte.

The solid electrolyte layer 15 may contain a binder, such as a polyethylene oxide or a polyvinylidene fluoride, in addition to the above-mentioned solid electrolyte.

A thickness of the solid electrolyte layer 15 is, for example, more than or equal to 5 μm and less than or equal to 150 μm.

The solid electrolyte may be in the form of particles. The solid electrolyte may be a sintered body.

The positive electrode terminal 17 and the negative electrode terminal 18 will be described below. Those terminals 17 and 18 are made of, for example, low-resistance conductors. The terminals 17 and 18 are each given as, for example, a material that is obtained by curing a conductive resin containing conductive metal particles of Ag or the like. For example, a later-described conductive resin paste can be used as the conductive resin. The terminals 17 and 18 may be each given as a material that is obtained by coating a conductive metal plate, such as a SUS plate, with a conductive adhesive. For example, a later-described thermosetting conductive paste can be used as the conductive adhesive. By using the conductive adhesive, the laminate of the plurality of cells 30 can be sandwiched between two metal plates. The conductive adhesive is not limited to a particular one insofar as electrical conductivity and adhesiveness can be maintained in a temperature range of the multilayer battery 100 in use and a manufacturing process of the multilayer battery 100. A type, thickness, and material of the conductive adhesive are not limited to particular ones insofar as the conductive adhesive does not affect life characteristics and battery characteristics of the multilayer battery 100 and durability of the conductive adhesive can be maintained even in the case of a current passing through the conductive adhesive at a maximum rate that is demanded in the usage environment of the multilayer battery 100. The terminals 17 and 18 may be subjected to a plating process with Ni—Sn, for example.

Materials of the positive electrode current collector 11, the negative electrode current collector 13, and the bipolar current collector 16 are not limited to particular ones insofar as the current collectors are made of conductive materials. The materials of the current collectors 11, 13 and 16 are, for example, stainless, nickel, aluminum, iron, titanium, copper, palladium, gold, and platinum. Those materials of the current collectors 11, 13 and 16 may be used solely or as an alloy in a combination of two or more types. The current collectors 11, 13 and 16 may be each in the form of a foil, a plate, or a mesh. The materials of the current collectors 11, 13 and 16 are not limited to particular ones insofar as the current collectors 11, 13 and 16 do not melt and decompose in the manufacturing process of the battery 100, at the temperature of the battery 100 in use, and under pressure inside the battery 100. Those materials can be selected as appropriate in consideration of operating potentials applied in the battery 100 to the current collectors 11, 13 and 16 and electrical conductivities of the current collectors 11, 13 and 16. Furthermore, the materials of the current collectors 11, 13 and 16 may also be selected depending on tensile strength and heat resistance that are demanded for the current collectors 11, 13 and 16. Examples of the materials of the current collectors 11, 13 and 16 are copper, aluminum, and alloys containing those metals as main ingredients. The current collectors 11, 13 and 16 may be made of a cladding material that is obtained by laminating an electrolytic copper foil or a dissimilar metal foil with high strength. A thickness of each of the current collectors 11, 13 and 16 is, for example, more than or equal to 10 μm and less than or equal to 100 μm.

A material of the sealing member 21 is not limited to a particular one insofar as insulating properties are obtained. The material of the sealing member 21 is, for example, an insulating resin such as polypropylene, polyethylene, or polyamide.

Materials of the first anchor member 19 and the second anchor member 20 are not limited to particular ones. The materials of the first anchor member 19 and the second anchor member 20 may be, for example, ones described above as the materials of the current collectors 11, 13 and 16. The material of the first anchor member 19*d* may be the same as that of the negative electrode current collector 13. The material of the second anchor member 20*a* may be the same as that of the positive electrode current collector 11. The materials of the first anchor members 19*a*, 19*b* and 19*c* may be respectively the same as those of the bipolar current collectors 16*a*, 16*b* and 16*c*. The materials of the second anchor members 20*b*, 20*c* and 20*d* may be respectively the same as those of the bipolar current collectors 16*a*, 16*b* and 16*c*. A thickness of each of the anchor members 19 and 20 is, for example, more than or equal to 10 μm and less than or equal to 100 μm.

The above-described features of the multilayer battery 100 may be combined with each other as appropriate.

The structure of the battery 100 according to this embodiment is different from the structures of the batteries disclosed in Japanese Unexamined Patent Application Publication No. 2005-310402 and No. 2013-120717 in the following points.

Japanese Unexamined Patent Application Publication No. 2005-310402 discloses a bipolar battery of a structure in which electrode tabs to take out currents from current collectors in laminated a plurality of single-cell layers are connected to the current collectors and are led out to the outside of the battery. In the structure of the battery disclosed in Japanese Unexamined Patent Application Publication No. 2005-310402, the plurality of single-cell layers are not rigidly integrated together.

Japanese Unexamined Patent Application Publication No. 2013-120717 discloses an all-solid-state battery in which terminal current collectors are attached to end surfaces of a laminate including series current collectors. In the all-solid-state battery disclosed in Japanese Unexamined Patent Application Publication No. 2013-120717, however, there are no gaps between the terminal current collectors and the series current collectors. Furthermore, the all-solid-state battery disclosed in Japanese Unexamined Patent Application Publication No. 2013-120717 includes no anchor members.

The structures of the batteries disclosed in Japanese Unexamined Patent Application Publication No. 2005-310402 and No. 2013-120717 may cause the following problems in some cases because they are different from the structure of the battery 100 according to this embodiment with regard to arrangement of the electrodes to take out the currents from the current collectors, configuration of the current collectors, and the presence or absence of the anchor members.

In the structure of the battery disclosed in Japanese Unexamined Patent Application Publication No. 2005-310402, the electrode tabs are connected to the current collectors and are led out to the outside of the battery. However, that type of battery is difficult in some cases to reduce a size and to maintain reliability of, for example, connection strength between components included in the battery. Accordingly, the battery disclosed in Japanese Unexamined Patent Application Publication No. 2005-310402 is not suitable for realizing a higher voltage, a higher output power, and size reduction. If shock is applied to the battery disclosed in Japanese Unexamined Patent Application Publication No. 2005-310402, reliability of electrical connections in the battery is also low. Thus, the structure of the battery disclosed in Japanese Unexamined Patent Application Publication No. 2005-310402 has a difficulty in reducing the size and increasing the output power of the battery and may cause a problem with characteristics, such as shock resistance, related to reliability of the battery in some cases.

In the battery disclosed in Japanese Unexamined Patent Application Publication No. 2013-120717, the terminal current collectors are arranged at the end surfaces of the laminate. The terminal current collectors are components to pull out characteristics of the battery. Therefore, the terminal current collectors are required to have not only predetermined initial characteristics, but also reliability of electrical connections under various conditions. In the battery disclosed in Japanese Unexamined Patent Application Publication No. 2013-120717, however, battery cells are electrically connected to each other with the structure sandwiching the laminate between the plate-shaped terminal current collectors without including the anchor members. Accordingly, the battery disclosed in Japanese Unexamined Patent Application Publication No. 2013-120717 may cause a problem with mechanical strength and electrical connection strength against shock in some cases. Furthermore, according to Japanese Unexamined Patent Application Publication No. 2013-120717, insulating layers are formed on the terminal current collectors. If shock is applied to the battery disclosed in Japanese Unexamined Patent Application Publication No. 2013-120717 and the series current collectors are displaced, there is a possibility that any of end surfaces of the series current collectors, the end surfaces having been held so far in contact with the insulating layer, may come into contact with the terminal current collector. This may cause a short circuit in some cases.

Comparing with Japanese Unexamined Patent Application Publication No. 2005-310402 and No. 2013-120717, in the battery 100 according to this embodiment, the plurality of cells 30 are electrically connected in series and are integrated together. In the battery 100, the positive electrode current collector 11 and the negative electrode terminal 18 are electrically isolated from each other with the gap, and the negative electrode current collector 13 and the positive electrode terminal 17 are electrically isolated from each other with the gap. Furthermore, the bipolar current collector 16 is electrically isolated from each of the positive electrode terminal 17 and the negative electrode terminal 18 with the gap. In the battery 100 according to this embodiment, for example, the anchor members 19 and 20 are connected respectively to the terminals 17 and 18. Therefore, the above-mentioned problems are less likely to occur in the battery 100 according to this embodiment. Japanese Unexamined Patent Application Publication No. 2005-310402 and No. 2013-120717 do not disclose the above-described structure of the battery 100 according to this embodiment.

Method of Manufacturing Battery

An example of a method of manufacturing the battery 100 according to this embodiment will be described below. The battery 100 according to this embodiment can be manufactured by, for example, a sheet fabrication method.

In this specification, a process of fabricating the cell 30 is also called a "sheet fabrication process". In the sheet fabrication process, for example, a laminate is fabricated in which precursors of the individual components of each cell 30 included in the battery 100 according to this embodiment are laminated. In this specification, the "laminate" is also called a "precursor of the cell 30". In the precursor of the cell 30a, for example, a precursor of the positive electrode current collector 11, a sheet of the positive electrode layer 12, a sheet of the solid electrolyte layer 15, a sheet of the negative electrode layer 14, and a precursor of the bipolar current collector 16 are laminated in the mentioned order. In the precursor of each of the cells 30b and 30c, for example, a precursor of the bipolar current collector 16, a sheet of the positive electrode layer 12, a sheet of the solid electrolyte layer 15, a sheet of the negative electrode layer 14, and a precursor of the bipolar current collector 16 are laminated in the mentioned order. In the precursor of the cell 30d, for example, a precursor of the bipolar current collector 16, a sheet of the positive electrode layer 12, a sheet of the solid electrolyte layer 15, a sheet of the negative electrode layer 14, and a precursor of the negative electrode current collector 13 are laminated in the mentioned order. In each of the precursors of the cells 30a, 30b, 30c and 30d, the sheet of the solid electrolyte layer 15 is surrounded by the sealing member 21. The predetermined number of the laminates are fabricated in match with the number of the cells 30 to be connected in series. The order in forming the components included in the laminate is not limited to a particular one.

First, the sheet fabrication process is described. The sheet fabrication process includes steps of fabricating sheets that are the precursors of the individual components of the cell 30, and laminating those sheets.

The sheet of the positive electrode layer 12 can be fabricated by, for example, the following method. First, a slurry to fabricate the sheet of the positive electrode layer 12 is prepared by mixing a positive electrode active substance with materials to be mixed, such as a solid electrolyte, a conductive aid, a binder, and a solvent. In this specification, the slurry to fabricate the sheet of the positive electrode layer 12 is also called a "positive-electrode active substance slurry". Then, the positive-electrode active substance slurry is coated over the precursor of the positive electrode current collector 11 and the precursor of the bipolar current collector 16 by, for example, a printing method. The sheet of the positive electrode layer 12 is formed by drying an obtained coating film. As a result, the precursor of the positive electrode current collector 11 on which the sheet of the positive electrode layer 12 is laminated and the precursor of the bipolar current collector 16 on which the sheet of the positive electrode layer 12 is laminated are obtained. In this specification, the precursor of the bipolar current collector 16 on which the sheet of the positive electrode layer 12 is laminated is also called a "precursor A".

The precursor of the positive electrode current collector 11 and the precursor of the bipolar current collector 16 can be each given as, for example, a copper foil with a thickness of about 30 μm. The positive electrode active substance can be given as, for example, powder of a Li·Ni·Co·Al complex oxide ($LiNi_{0.8}Co_{0.15}Al_{0.05}O_2$) having a mean particle size of about 5 μm and a layered structure. The solid electrolyte as the material to be mixed can be given as, for example, glass powder of a $Li_2S$—$P_2S_5$-based sulfide having a mean particle size of about 10 μm and containing a triclinic crystal as a main ingredient. The solid electrolyte has high ion conductivity of, for example, more than or equal to $2 \times 10^{-3}$ S/cm and less than or equal to $3 \times 10^{-3}$ S/cm.

The positive-electrode active substance slurry can be coated over one surface of the copper foil forming each of the precursor of the positive electrode current collector 11 and the precursor of the bipolar current collector 16 by, for example, a screen printing method. An obtained coating film has, for example, a predetermined shape and a thickness of more than or equal to about 50 μm and less than or equal to 100 μm. Then, the sheet of the positive electrode layer 12 is obtained by drying the coating film. The coating film may be dried at a temperature of higher than or equal to 80° C. and lower than or equal to 130° C. A thickness of the sheet of the positive electrode layer 12 is, for example, more than or equal to 30 μm and less than or equal to 60 μm.

The sheet of the negative electrode layer 14 can be fabricated by, for example, the following method. First, a slurry to fabricate the sheet of the negative electrode layer 14 is prepared by mixing a negative electrode active substance, a solid electrolyte, a conductive aid, a binder, and a solvent. In this specification, the slurry to fabricate the sheet of the negative electrode layer 14 is also called a "negative-electrode active substance slurry". The negative-electrode active substance slurry is coated over the precursor of the negative electrode current collector 13 and the precursor of the bipolar current collector 16 by, for example, a printing method. The sheet of the negative electrode layer 14 is formed by drying an obtained coating film. As a result, the precursor of the negative electrode current collector 13 on which the sheet of the negative electrode layer 14 is laminated and the precursor of the bipolar current collector 16 on which the sheet of the negative electrode layer 14 is laminated are obtained. In this specification, the precursor of the bipolar current collector 16 on which the sheet of the negative electrode layer 14 is laminated is also called a "precursor B".

The precursor of the negative electrode current collector 13 can be given as, for example, a copper foil with a thickness of about 30 μm. The negative electrode active substance can be given as, for example, powder of natural graphite with a mean particle size of about 10 μm. The solid electrolyte can be given as, for example, the material that has been described above in connection with the method of fabricating the sheet of the positive electrode layer 12.

The negative-electrode active substance slurry can be coated over one surface of the copper foil forming each of the precursor of the negative electrode current collector 13 and the precursor of the bipolar current collector 16 by, for example, a screen printing method. An obtained coating film has, for example, a predetermined shape and a thickness of more than or equal to about 50 μm and less than or equal to 100 μm. Then, the sheet of the negative electrode layer 14 is obtained by drying the coating film. The coating film may be dried at a temperature of higher than or equal to 80° C. and lower than or equal to 130° C. A thickness of the sheet of the negative electrode layer 14 is, for example, more than or equal to 30 μm and less than or equal to 60 μm.

The sealing member 21 can be fabricated by, for example, the following method. First, a dispersion liquid of an insulating resin is prepared. The dispersion liquid is coated on the precursor of the positive electrode current collector 11, the precursor of the negative electrode current collector 13, the precursor A, and the precursor B, whereby coating films are obtained. The coating film to form the sealing member 21 surrounds, for example, the sheet of the positive electrode layer 12 or the sheet of the negative electrode layer 14. The sealing member 21 is formed by drying those coating films.

The sheet of the solid electrolyte layer 15 is arranged between the sheet of the positive electrode layer 12 and the sheet of the negative electrode layer 14 in a state surrounded by the sealing member 21. The sheet of the solid electrolyte layer 15 can be fabricated by, for example, the following method. First, a slurry to fabricate the sheet of the solid electrolyte layer 15 is prepared by mixing a solid electrolyte, a conductive aid, a binder, and a solvent. In this specification, the slurry to fabricate the sheet of the solid electrolyte layer 15 is also called a "solid electrolyte slurry". The solid electrolyte slurry is coated over the sheet of the positive electrode layer 12. Similarly, the solid electrolyte slurry is coated over the sheet of the negative electrode layer 14. The coating of the solid electrolyte slurry is performed by, for example, a printing method using a metal mask. An obtained coating film has a thickness of, for example, about 100 μm. Then, the coating film is dried. The coating film may be dried at a temperature of higher than or equal to 80° C. and lower than or equal to 130° C. As a result, the sheet of the solid electrolyte layer 15 is formed on each of the sheet of the positive electrode layer 12 and the sheet of the negative electrode layer 14.

The method of fabricating the sheet of the solid electrolyte layer 15 is not limited to the above-described one. The sheet of the solid electrolyte layer 15 may be fabricated by the following method. First, the solid electrolyte slurry is coated over a base by, for example, a printing method. A material of the base is not limited to a particular one insofar as the sheet of the solid electrolyte layer 15 can be formed on the base, and is, for example, Teflon (registered trademark) or polyethylene terephthalate (PET). The base is in the form of, for example, a film or a foil. Then, the sheet of the solid electrolyte layer 15 is obtained by drying a coating film formed on the base. The sheet of the solid electrolyte layer 15 can be used after peeling off the sheet from the base.

The solvents used for the positive-electrode active substance slurry, the negative-electrode active substance slurry, and the solid electrolyte slurry are not limited to particular ones insofar as the solvents can dissolve the binder and do not adversely affect the battery characteristics. The solvents can be given as, for example, alcohols such as ethanol, isopropanol, n-butanol, and benzyl alcohol, organic solvents such as toluene, ethyl acetate, butyl acetate, acetone, methyl ethyl ketone, methyl isobutyl ketone, ethylene glycol ethyl ether, isophorone, butyl lactate, dioctyl phthalate, dioctyl adipate, N,N-dimethylformamide (DMF), and N-methyl-2-pyrrolidone (NMP), and water. Those solvents may be used solely or in combination of two or more types.

While, in the above-described embodiment, the screen printing method is used, by way of example, as the method of coating the positive-electrode active substance slurry, the negative-electrode active substance slurry, and the solid electrolyte slurry, the coating method is not limited to that case. For example, a doctor blade method, a calender method, a spin coating method, a dip coating method, an ink jet method, an offset method, a die coating method, or a spray method may also be used as the coating method.

The positive-electrode active substance slurry, the negative-electrode active substance slurry, and the solid electrolyte slurry may be each mixed with an aid, such as a plasticizer, as appropriate in addition to the above-described positive electrode active substance, negative electrode active substance, solid electrolyte, conductive aid, binder, and solvent. A method of mixing the slurry is not limited to a particular one. The slurry may be mixed with, as required, an additive such as a thickener, a plasticizer, a defoamer, a leveling agent, or an adhesion improver.

Then, the sheet of the solid electrolyte layer 15 formed on the sheet of the positive electrode layer 12 and the sheet of the solid electrolyte layer 15 formed on the sheet of the negative electrode layer 14 are placed one above the other. In more detail, the precursor of the cell 30*a* is obtained by placing the sheet of the solid electrolyte layer 15 laminated on the precursor of the positive electrode current collector 11 and the sheet of the solid electrolyte layer 15 laminated on the precursor B one above the other. The precursor of the cell 30*b* and the precursor of the cell 30*c* are each obtained by placing the sheet of the solid electrolyte layer 15 laminated on the precursor A and the sheet of the solid electrolyte layer 15 laminated on the precursor B one above the other. The precursor of the cell 30*d* is obtained by placing the sheet of the solid electrolyte layer 15 laminated on the precursor A and the sheet of the solid electrolyte layer 15 laminated on the precursor of the negative electrode current collector 13 one above the other. In the precursor of the cell 30*a*, an end surface of the positive electrode current collector 11 is aligned with, for example, that of the precursor B in a plan view. In each of the precursor of the cell 30*b* and the precursor of the cell 30*c*, an end surface of the precursor A is aligned with, for example, that of the precursor B in a plan view. In the precursor of the cell 30*d*, an end surface of the negative electrode current collector 13 is aligned with, for example, that of the precursor A in a plan view.

Then, in the precursor of the cell 30*a*, the precursor of the positive electrode current collector 11 is cut to obtain the positive electrode current collector 11. In more detail, the precursor of the positive electrode current collector 11 is cut such that, when the negative electrode terminal 18 is arranged, the positive electrode current collector 11 and the negative electrode terminal 18 are electrically isolated from each other with the gap. A cut surface of the positive electrode current collector 11 extends straight in the second direction y, for example. The precursor of the positive electrode current collector 11 can be cut by using, for example, a laser. By cutting the precursor of the positive electrode current collector 11, the second anchor member 20 can also be formed in addition to the positive electrode current collector 11. The shortest distance between the positive electrode current collector 11 and the second anchor member 20 is, for example, 10 μm. With the presence of the gap between the positive electrode current collector 11 and the second anchor member 20, the positive electrode current collector 11 and the second anchor member 20 are electrically isolated from each other. In other words, the gap between the positive electrode current collector 11 and the second anchor member 20 maintains electrical insulation.

Then, in the precursor of the cell 30*d*, the precursor of the negative electrode current collector 13 is cut to obtain the negative electrode current collector 13. In more detail, the precursor of the negative electrode current collector 13 is cut such that, when the positive electrode terminal 17 is arranged, the negative electrode current collector 13 and the positive electrode terminal 17 are electrically isolated from each other with the gap. A cut surface of the negative electrode current collector 13 extends straight in the second direction y, for example. The precursor of the negative electrode current collector 13 can be cut by using, for example, a laser. By cutting the precursor of the negative electrode current collector 13, the first anchor member 19 can also be formed in addition to the negative electrode current collector 13. The shortest distance between the negative electrode current collector 13 and the first anchor member 19 is, for example, 10 μm. With the presence of the gap between the negative electrode current collector 13 and the first anchor member 19, the negative electrode current collector 13 and the first anchor member 19 are electrically isolated from each other. In other words, the gap between the negative electrode current collector 13 and the first anchor member 19 maintains electrical insulation.

Then, in the precursor of each of the cells 30*a*, 30*b*, 30*c* and 30*d*, the precursor of the bipolar current collector 16 is cut. In more detail, the precursors A and B are cut such that, when the positive electrode terminal 17 and the negative electrode terminal 18 are arranged, the bipolar current collector 16 is electrically isolated from each of the positive electrode terminal 17 and the negative electrode terminal 18 with the gap. Each of the cut precursors A and B has, for example, two cut surfaces. Each of the two cut surfaces extends straight in the second direction y, for example. The precursors A and B can be cut by using, for example, a laser. By cutting the precursors A and B, the first anchor member 19 and the second anchor member 20 can be formed. The shortest distance between each of the cut precursors A and B and the first anchor member 19 and the shortest distance between each of the cut precursors A and B and the second anchor member 20 are, for example, 10 μm. With the presence of the gap between each of the cut precursors A and B and the first anchor member 19 and the gap between each of the cut precursors A and B and the second anchor member 20, the cut precursors A and B are electrically isolated from the first and second anchor members 19 and 20. In other words, the gap between each of the cut precursors A and B and each of the first and second anchor members 19 and 20 maintains electrical insulation.

An order of cutting the precursor of the positive electrode current collector 11, cutting the precursor of the negative electrode current collector 13, and cutting the precursor of the bipolar current collector 16 is not limited to a particular one. The precursor of the negative electrode current collector 13 or the precursor of the bipolar current collector 16 may be cut after cutting the precursor of the positive electrode current collector 11. The precursor of the positive electrode current collector 11 or the precursor of the bipolar current collector 16 may be cut after cutting the precursor of the negative electrode current collector 13. The precursor of the negative electrode current collector 13 or the precursor of the positive electrode current collector 11 may be cut after cutting the precursor of the bipolar current collector 16. The cutting of the precursor of the positive electrode current collector 11, the cutting of the precursor of the negative electrode current collector 13, and the cutting of the precursor of the bipolar current collector 16 may be performed before placing the sheet of the solid electrolyte layer 15 formed on the sheet of the positive electrode layer 12 and the sheet of the solid electrolyte layer 15 formed on the sheet of the negative electrode layer 14 one above the other. The cutting of the precursor of the positive electrode current collector 11, the cutting of the precursor of the negative electrode current collector 13, and the cutting of the precursor of the bipolar current collector 16 may be performed with a dicing machine or the like. An insulating portion may be formed by not only cutting the precursor of the positive electrode current collector 11, but also removing part of the relevant precursor. An insulating portion may be formed by not only cutting the precursor of the negative electrode current collector 13, but also removing part of the relevant precursor. An insulating portion may be formed by not only cutting the precursor of the bipolar current collector 16, but also removing part of the relevant precursor.

As described above, the cells 30*a*, 30*b*, 30*c* and 30*d* are obtained by cutting the precursor of the positive electrode current collector 11, the precursor of the negative electrode current collector 13, and the precursor of the bipolar current collector 16. In the cell 30a, the cut precursor B has a principal surface exposed to the outside of the cell 30a. In each of the cells 30b and 30c, the cut precursors A and B have principal surfaces exposed to the outside of the cells 30b and 30c. In the cell 30d, the cut precursor A has a principal surface exposed to the outside of the cell 30d.

Then, for example, a conductive adhesive is coated over the externally exposed principal surface of the cell 30 in each of the cut precursors A and B. The conductive adhesive can be coated by, for example, a screen printing method. In this specification, the principal surface of each of the cut precursors A and B on which an adhesive material has been coated is also called a "bonding surface". Then, the bonding surface of the cut precursor B in the cell 30a and the bonding surface of the cut precursor A in the cell 30b are bonded to each other. By bonding the bonding surface of the precursor A and the bonding surface of the precursor B, the bipolar current collector 16 is obtained. The bonding surface of the cut precursor B in the cell 30b and the bonding surface of the cut precursor A in the cell 30c are bonded to each other. The bonding surface of the cut precursor B in the cell 30c and the bonding surface of the cut precursor A in the cell 30d are bonded to each other. As a result, a laminate made up of the laminated a plurality of cells 30 is obtained. The bonding surfaces can be bonded to each other by, for example, pressure bonding. A temperature when bonding the bonding surfaces is, for example, higher than or equal to 50° C. and lower than or equal to 100° C. A pressure applied to the cells 30 when bonding the bonding surfaces is, for example, higher than or equal to 300 MPa and lower than or equal to 400 MPa. A time during which the pressure is applied to the cells 30 is, for example, longer than or equal to 90 sec and shorter than or equal to 120 sec. The bonding can also be made by using a low-resistance conductive tape instead of the conductive adhesive. Paste-like silver powder or copper powder can also be used instead of the conductive adhesive. By pressure-bonding the bonding surface of one cell 30, coated with the paste-like silver powder or copper powder, to the bonding surface of another cell 30, metal particles and the current collector can be mechanically joined to each other with the anchoring effect. A method of laminating the plurality of cells 30 is not limited to a particular one insofar as bonding performance and electrical conductivity can be ensured with the method.

Then, the laminate of the plurality of cells 30 is electrically connected to the positive electrode terminal 17 and the negative electrode terminal 18. The laminate of the plurality of cells 30 can be electrically connected to the terminals 17 and 18 by, for example, the following method. First, a conductive resin paste is coated over surfaces of the laminate of the plurality of cells 30 on which the terminals 17 and 18 are to be arranged. By curing the coated conductive resin paste, the terminals 17 and 18 are formed. As a result, the battery 100 according to this embodiment is obtained. A temperature when curing the conductive resin paste is, for example, higher than or equal to 100° C. and lower than or equal to 300° C. A time during which the conductive resin paste is cured is, for example, 60 min.

The conductive resin paste can be given as, for example, a thermosetting conductive paste that contains high-melting and highly conductive metal particles containing Ag, Cu, Ni, Zn, Al, Pd, Au, Pt, or an alloy of any of those metals, low-melting metal particles, and resin. A melting point of the highly conductive metal particles is, for example, higher than or equal to 400° C. A melting point of the low-melting metal particles may be lower than or equal to the curing temperature of the conductive resin paste, or lower than or equal to 300° C. Materials of the low-melting metal particles are, for example, Sn, SnZn, SnAg, SnCu, SnAl, SnPb, In, InAg, InZn, InSn, Bi, BiAg, BiNi, BiSn, BiZn, and BiPb. Using the conductive paste containing such low-melting metal powder causes both solid-phase and liquid-phase reactions to progress at a contact location between the conductive paste and the current collector or the anchor member at a thermosetting temperature lower than the melting point of the low-melting metal particles. As a result, for example, an alloy of the metal contained in the conductive paste and the metal contained in the current collector or the anchor member is formed. Thus, a diffusion layer containing the above-mentioned alloy is formed near a connection region between the current collector or the anchor member and the terminal. When Ag or an Ag alloy is used for the conductive particles and Cu is used for the current collector, a highly conductive alloy containing AgCu is formed. Furthermore, for example, AgNi or AgPd may also be formed depending on a combination of the material of the conductive particles and the material of the current collector. In such a manner, the terminal and the current collector or the anchor member are integrally joined to each other with the aid of the diffusion layer containing the alloy. According to the above-described feature, the terminal and the current collector or the anchor member are more rigidly connected than in the case of utilizing the anchoring effect. Hence a problem of disconnection of the individual components of the battery 100 attributable to a difference in thermal expansion caused by, for example, heat cycles in the individual components or shock applied to them is less likely to occur.

Shapes of the highly conductive metal particles and the low-melting metal particles are not limited to particular ones and may be spherical, scaly, or needle-like. An alloying reaction and diffusion of the alloy at a lower temperature further progress as sizes of the above-mentioned metal particles reduce. From that point of view, the sizes and the shapes of those metal particles may be adjusted as appropriate in consideration of influences of thermal history upon process design and characteristics of the battery.

The resin used for the thermosetting conductive paste is not limited to a particular one insofar as functioning as a binder, and an appropriate resin can be selected depending on the manufacturing process to be employed, including adaptability for the printing method, coating properties, and so on. The resin used for the thermosetting conductive paste includes, for example, a thermosetting resin. The thermosetting resin is, for example, any of amino resins such as urea resin, melamine resin, and guanamine resin, epoxy resins such as bisphenol A type, bisphenol F type, phenol novolac type, and alicyclic type, oxcetane resin, phenol resins such as resol type and novolac type, and silicone modified organic resins such as silicone epoxy and silicone polyester. The above-mentioned resins may be used solely or in a combination of two or more types.

The manufacturing method according to this embodiment has been described in connection with an example of fabricating the battery 100 by a powder compaction process. However, a laminate of sintered bodies may be fabricated by a firing process, and the terminals 17 and 18 may be fabricated by a baking process.

Second Embodiment

Figure 2:
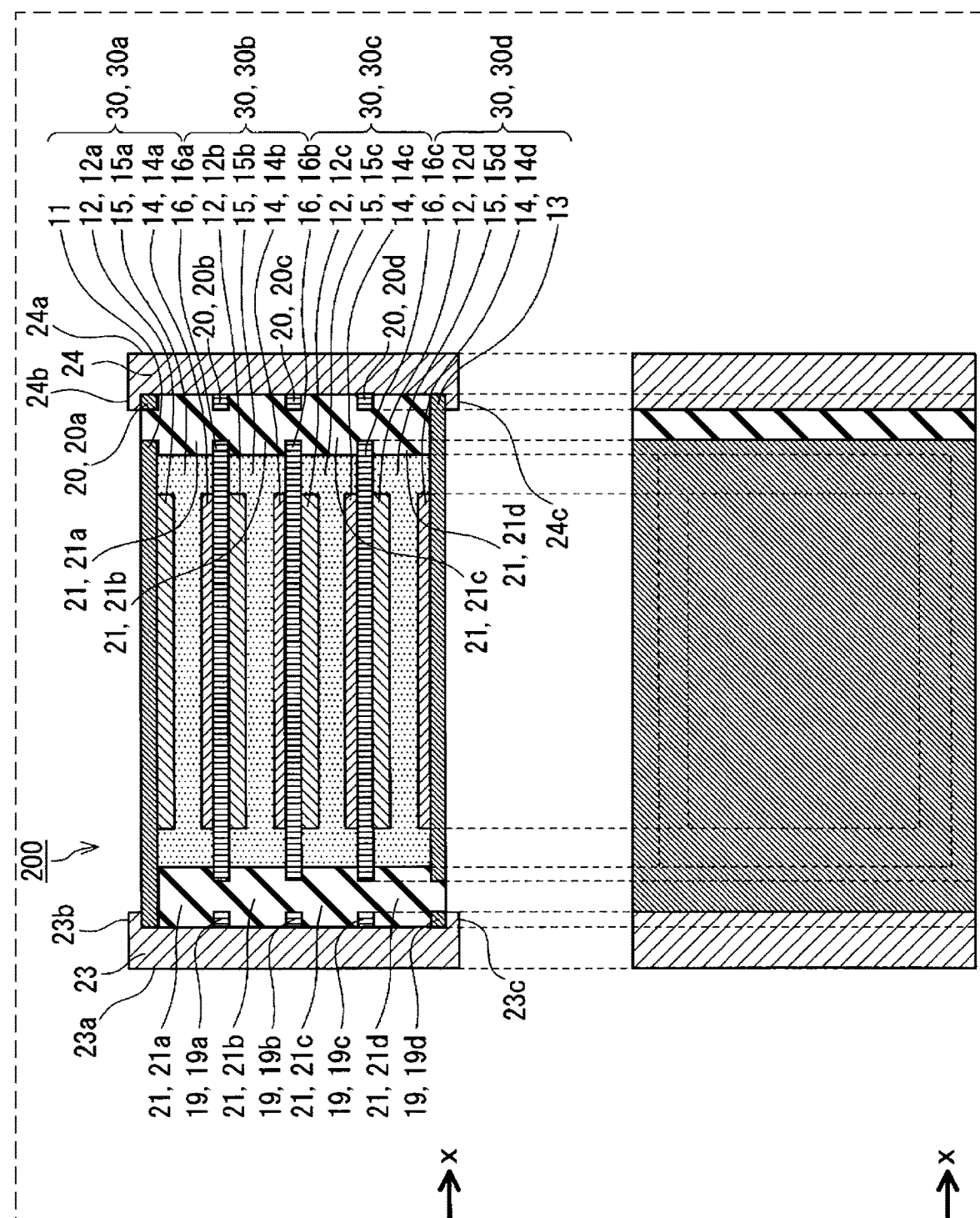
FIG. 2 illustrates a sectional view and a plan view schematically illustrating a structure of a battery according to a second embodiment.

FIG. 2 is a schematic view illustrating a structure of a battery 200 according to a second embodiment. FIG. 2(a) is a sectional view of the battery 200 according to this embodiment. FIG. 2(b) is a plan view of the battery 200. In the battery 200, as illustrated in FIG. 2, a positive electrode terminal 23 covers the principal surface of the positive electrode current collector 11 and a principal surface of the first anchor member 19d. A negative electrode terminal 24 covers the principal surface of the negative electrode current collector 13 and a principal surface of the second anchor member 20a. Except for the above point, the structure of the battery 200 is similar to that of the battery 100 according to the first embodiment. With that in mind, elements in common to both the battery 100 according to the first embodiment and the battery 200 according to this embodiment are denoted by the same reference signs and description of those elements is omitted in some cases. In other words, the following descriptions regarding several embodiments are mutually applicable insofar as there are no technical contradictions. Moreover, the embodiments may be combined with each other insofar as there are no technical contradictions.

The positive electrode terminal 23 may partially or entirely cover the principal surface of the positive electrode current collector 11. Stated in another way, the positive electrode terminal 23 at least partially covers an upper surface of the positive electrode current collector 11 that is positioned at an upper end of the battery 200. Furthermore, in the battery 200, the positive electrode terminal 23 covers the principal surface of the first anchor member 19d included in the cell 30d that is positioned on the outermost side among the plurality of cells 30. Stated in another way, the positive electrode terminal 23 covers a lower surface of the first anchor member 19d that is positioned at a lower end of the battery 200.

In more detail, the positive electrode terminal 23 includes a main body portion 23a and fixing portions 23b and 23c. The main body portion 23a extends in the third direction z. The fixing portions 23b and 23c fix the plurality of cells 30. The plurality of cells 30 are sandwiched between the fixing portions 23b and 23c. The fixing portions 23b and 23c are connected to a pair of end surfaces of the main body portion 23a in a one-to-one relationship. Each of the fixing portions 23b and 23c extends in the first direction x. The fixing portion 23b covers the principal surface of the positive electrode current collector 11. The fixing portion 23c covers the principal surface of the first anchor member 19d.

The negative electrode terminal 24 may partially or entirely cover the principal surface of the negative electrode current collector 13. Stated in another way, the negative electrode terminal 24 at least partially covers a lower surface of the negative electrode current collector 13 that is positioned at the lower end of the battery 200. Furthermore, in the battery 200, the negative electrode terminal 24 covers the principal surface of the second anchor member 20a included in the cell 30a that is positioned on the outermost side among the plurality of cells 30. Stated in another way, the negative electrode terminal 24 covers an upper surface of the second anchor member 20a that is positioned at the upper end of the battery 200.

In more detail, the negative electrode terminal 24 includes a main body portion 24a and fixing portions 24b and 24c. The main body portion 24a extends in the third direction z. The fixing portions 24b and 24c fix the plurality of cells 30. The plurality of cells 30 are sandwiched between the fixing portions 24b and 24c. The fixing portions 24b and 24c are connected to a pair of end surfaces of the main body portion 24a in a one-to-one relationship. Each of the fixing portions 24b and 24c extends in a direction opposite to the first direction x. The fixing portion 24b covers the principal surface of the second anchor member 20a. The fixing portion 24c covers the principal surface of the negative electrode current collector 13.

With the above-described feature, the multilayer battery 200 integrated with higher joining strength can be realized. In particular, the above-described feature is able to increase reliability of the battery 200 against stress that is concentratedly generated around the terminals 23 and 24 due to flexing of the current collectors 11 and 13.

The fixing portions 23b, 23c, 24b and 24c of the terminals 23 and 24 can be fabricated by, for example, the following method. First, a conductive resin paste is coated over the upper surfaces of both the positive electrode current collector 11 and the second anchor member 20a that are positioned at an upper end of the laminate of the plurality of cells 30. The conductive resin paste is further coated over the lower surfaces of both the negative electrode current collector 13 and the first anchor member 19d that are positioned at a lower end of the laminate of the plurality of cells 30. The conductive resin paste can be coated by, for example, a screen printing method. By thermosetting the conductive resin paste, the fixing portions 23b, 23c, 24b and 24c are formed.

On that occasion, the fixing portions 23b and 24b should be formed such that the positive electrode current collector 11 and the second anchor member 20a will not cause a short circuit. Similarly, the fixing portions 23c and 24c should be formed such that the negative electrode current collector 13 and the first anchor member 19d will not cause a short circuit.

With the above-described structure of the terminals 23 and 24, the laminate of the plurality of cells 30 can be held by the fixing portions 23b, 23c, 24b and 24c in a sandwiched state. As a result, the battery 200 with higher durability against shocks applied from a plurality of directions can be realized.

By using, as the conductive resin paste, the above-described thermosetting resin paste that contains the highly conductive metal particles, the low-melting metal particles, and the resin, the diffusion layer containing the alloy can be formed at an interface between the fixing portion 23b and the positive electrode current collector 11, an interface between the fixing portion 23c and the first anchor member 19d, an interface between the fixing portion 24b and the second anchor member 20a, and an interface between the fixing portion 24c and the negative electrode current collector 13. As a result, the terminals 23 and 24 and the laminate of the plurality of cells 30 can be more rigidly integrated together. Hence the multilayer battery 200 with higher shock resistance can be realized.

Third Embodiment

Figure 3:
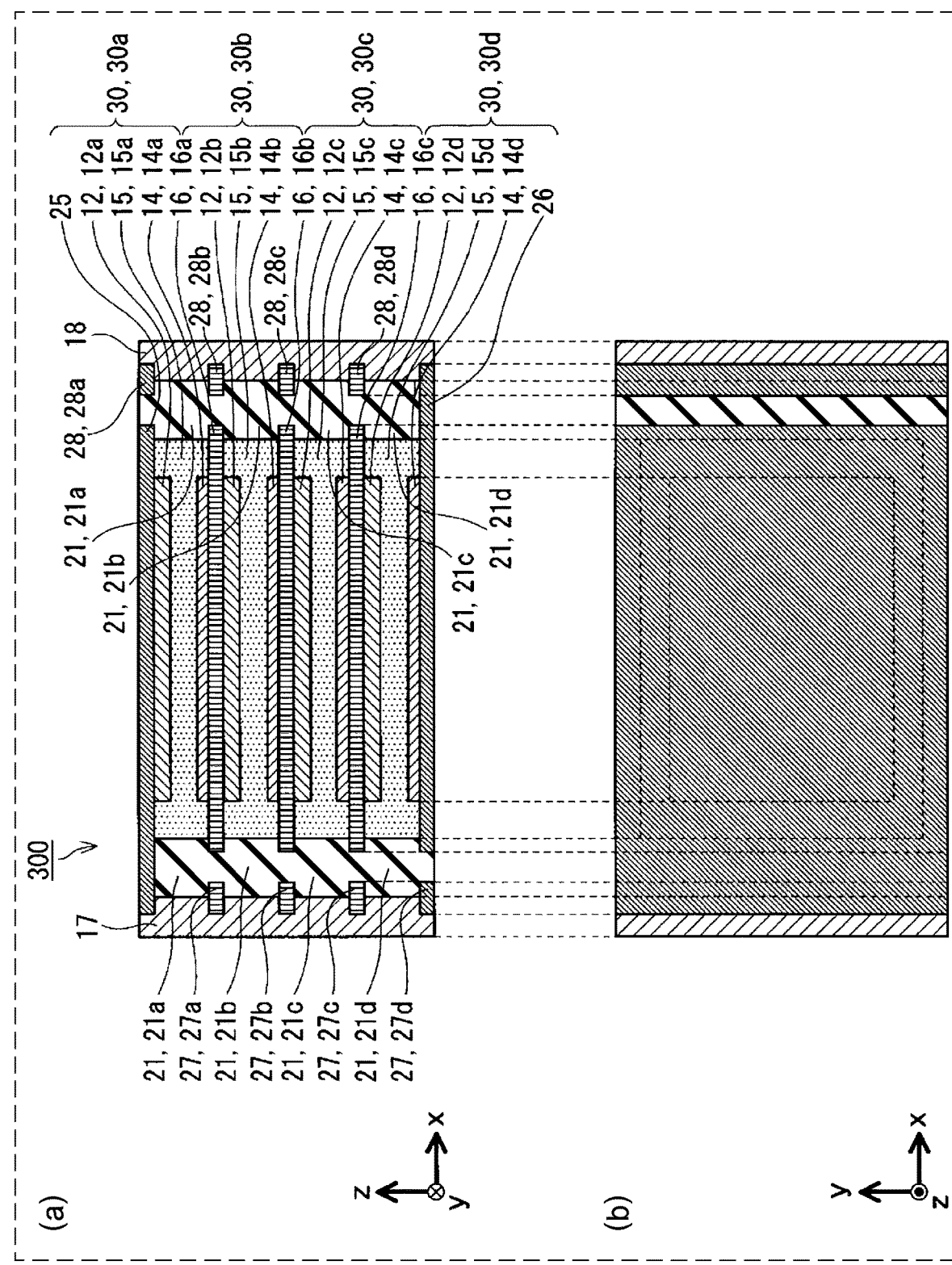
FIG. 3 illustrates a sectional view and a plan view schematically illustrating a structure of a battery according to a third embodiment.

FIG. 3 is a schematic view illustrating a structure of a battery 300 according to a third embodiment. FIG. 3(a) is a sectional view of the battery 300 according to this embodiment. FIG. 3(b) is a plan view of the battery 300. As illustrated in FIG. 3, a positive electrode current collector 25 and first anchor members 27a, 27b, 27c and 27d are partially embedded in the positive electrode terminal 17. At least one of the positive electrode current collector 25 or the plurality of first anchor members 27 in the battery 300 may be partially embedded in the positive electrode terminal 17. Similarly, a negative electrode current collector 26 and second anchor members 28a, 28b, 28c and 28d are partially embedded in the negative electrode terminal 18. At least one of the negative electrode current collector 26 or the plurality of second anchor members 28 in the battery 300 may be partially embedded in the negative electrode terminal 18. As a result, reliability of connections of the terminals 17 and 18 to the laminate of the plurality of cells 30 is increased. The above-described feature is able to further increase reliability of cool-heat cycles in the battery 300 and reliability against shock.

Sizes of a portion of the positive electrode current collector 25 and a portion of the first anchor member 27, both the portions being embedded in the positive electrode terminal 17, are not limited to particular values insofar as those portions do not penetrate through the positive electrode terminal 17 in a thickness direction of the positive electrode terminal 17. For example, a portion of the positive electrode current collector 25 ranging from an end of the positive electrode current collector 25 through a distance of longer than or equal to 1 µm is embedded in the positive electrode terminal 17. For example, a portion of the first anchor member 27 ranging from an end of the first anchor member 27 through a distance of longer than or equal to 1 µm is embedded in the positive electrode terminal 17.

Similarly, sizes of a portion of the negative electrode current collector 26 and a portion of the second anchor member 28, both the portions being embedded in the negative electrode terminal 18, are not limited to particular values insofar as those portions do not penetrate through the negative electrode terminal 18 in a thickness direction of the negative electrode terminal 18. For example, a portion of the negative electrode current collector 26 ranging from an end of the negative electrode current collector 26 through a distance of longer than or equal to 1 µm is embedded in the negative electrode terminal 18. For example, a portion of the second anchor member 28 ranging from an end of the second anchor member 28 through a distance of longer than or equal to 1 µm is embedded in the negative electrode terminal 18.

The current collectors 25 and 26 and the anchor members 27 and 28 of the battery 300 can be fabricated by, for example, the following method. First, a solid electrolyte capable of being sintered during a thermosetting process when the terminals 17 and 18 are fabricated is prepared as the solid electrolyte to be contained in the solid electrolyte layer 15. Such a solid electrolyte is, for example, glass made of a $Li_2S$—$P_2S_5$-based sulfide. The solid electrolyte is contracted upon being sintered. By using that type of solid electrolyte, pressures are applied to the current collectors 25 and 26 and the anchor members 27 and 28 included in the plurality of cells 30 in the third direction z and the direction opposite to the third direction z when the terminals 17 and 18 are fabricated. With an effect due to the action of the applied pressures, the positive electrode current collector 25 and the first anchor member 27 are caused to project toward the positive electrode terminal 17. Furthermore, the negative electrode current collector 26 and the second anchor member 28 are caused to project toward the negative electrode terminal 18. As a result, the multilayer battery 300 can be fabricated in which the positive electrode current collector 25, the negative electrode current collector 26, the first anchor member 27, and the second anchor member 28 are partially embedded in the corresponding terminals 17 and 18. The current collectors 25 and 26 and the anchor members 27 and 28 of the battery 300 can also be fabricated by pressurizing the laminate of the plurality of cells 30. In the pressurization, pressure is applied in the third direction z, for example. The pressure applied in the pressurization is, for example, higher than or equal to 20 kg/cm$^2$ and lower than or equal to 100 kg/cm$^2$.

With the structure of the battery 300, since electrical connections and mechanical connections of the positive electrode current collector 25, the negative electrode current collector 26, the first anchor member 27, and the second anchor member 28 to the terminals 17 and 18 are more rigid, it is possible to suppress a connection failure caused by heat shock, and to obtain the multilayer battery 300 with higher shock resistance and higher reliability.

The battery according to the present disclosure has been described above in connection with the embodiments, but the present disclosure is not limited to the above-described embodiments. Batteries obtained by applying various modifications conceivable by those skilled in the art to the above-described embodiments and constituted by combining some of the components in the different embodiments with each other also fall within the scope of the present disclosure insofar as not departing from the gist of the present disclosure.

The battery according to the present disclosure can be utilized as a secondary battery, such as an all-solid-state battery, which is used in a variety of electronic devices and automobiles.

What is claimed is:

1. A battery comprising:
   a positive electrode terminal and a negative electrode terminal;
   a positive electrode layer and a negative electrode layer;
   a positive electrode current collector electrically connected to each of the positive electrode layer and the positive electrode terminal;
   a negative electrode current collector electrically connected to each of the negative electrode layer and the negative electrode terminal;
   a bipolar current collector positioned between the positive electrode current collector and the negative electrode current collector;
   a solid electrolyte layer positioned between the positive electrode current collector and the negative electrode current collector; and
   an insulating sealing member positioned between the positive electrode current collector and the negative electrode current collector and surrounding the solid electrolyte layer, wherein;
   the positive electrode current collector and the negative electrode terminal are electrically isolated from each other with a first gap,
   the negative electrode current collector and the positive electrode terminal are electrically isolated from each other with a second gap,
   the bipolar current collector is electrically isolated from each of the positive electrode terminal and the negative electrode terminal with a third gap,
   each of the positive electrode current collector and the negative electrode current collector has an inner surface facing the insulating sealing member, an outer surface opposite to the inner surface and an end face connecting the inner surface and the outer surface, and
   the positive electrode terminal is in contact with the end face of the positive electrode current collector and/or the negative electrode terminal is in contact the end face of the negative electrode current collector.

2. The battery according to claim 1, further comprising:
   a first anchor member connected to the positive electrode terminal and electrically isolated from each of the negative electrode current collector and the bipolar current collector with a fourth gap; and a second anchor member connected to the negative electrode terminal and electrically isolated from each of the positive electrode current collector and the bipolar current collector with a fifth gap.

3. The battery according to claim 2, wherein part of the first anchor member is embedded in the positive electrode terminal, or part of the second anchor member is embedded in the negative electrode terminal.

4. The battery according to claim 3, wherein a portion of the first anchor member ranging from an end of the first anchor member through a distance of longer than or equal to 1 µm is embedded in the positive electrode terminal, or a portion of the second anchor member ranging from an end of the second anchor member through a distance of longer than or equal to 1 µm is embedded in the negative electrode terminal.

5. The battery according to claim 2, wherein a portion of the first anchor portion is embedded in the positive electrode terminal and another portion is embedded in the sealing member, or a portion of the second anchor portion is embedded in the negative electrode terminal and another portion is embedded in the sealing member.

6. The battery according to claim 2, wherein:
the first anchor portion is arranged to be in line with at least one of the negative electrode current collector and the bipolar current collector in a first direction which is orthogonal to a laminating direction in which the positive electrode layer, the negative electrode layer, and the solid electrolyte layer are laminated, and
the second anchor portion is arranged to be in line with at least one of the positive electrode current collector and the bipolar current collector in the first direction.

7. The battery according to claim 1, wherein the positive electrode terminal covers a principal surface of the positive electrode current collector, or the negative electrode terminal covers a principal surface of the negative electrode current collector.

8. The battery according to claim 1, wherein part of the positive electrode current collector is embedded in the positive electrode terminal, or part of the negative electrode current collector is embedded in the negative electrode terminal.

9. The battery according to claim 8, wherein a portion of the positive electrode current collector ranging from an end of the positive electrode current collector through a distance of longer than or equal to 1 µm is embedded in the positive electrode terminal, or a portion of the negative electrode current collector ranging from an end of the negative electrode current collector through a distance of longer than or equal to 1 µm is embedded in the negative electrode terminal.

10. A battery comprising:
a positive electrode terminal and a negative electrode terminal;
a positive electrode layer and a negative electrode layer;
a positive electrode current collector electrically connected to each of the positive electrode layer and the positive electrode terminal;
a negative electrode current collector electrically connected to each of the negative electrode layer and the negative electrode terminal;
a bipolar current collector positioned between the positive electrode current collector and the negative electrode current collector;
a solid electrolyte layer positioned between the positive electrode current collector and the negative electrode current collector; and
an insulating sealing member positioned between the positive electrode current collector and the negative electrode current collector and surrounding the solid electrolyte layer, wherein:
the positive electrode current collector and the negative electrode terminal are electrically isolated from each other with a first gap,
the negative electrode current collector and the positive electrode terminal are electrically isolated from each other with a second gap,
the bipolar current collector is electrically isolated from each of the positive electrode terminal and the negative electrode terminal with a third gap, and
the positive electrode current collector is electrically connected to the positive electrode terminal with a first alloy, or the negative electrode current collector is electrically connected to the negative electrode terminal with a second alloy.

11. A battery comprising:
a positive electrode terminal and a negative electrode terminal;
a positive electrode layer and a negative electrode layer;
a positive electrode current collector electrically connected to each of the positive electrode layer and the positive electrode terminal;
a negative electrode current collector electrically connected to each of the negative electrode layer and the negative electrode terminal;
a bipolar current collector positioned between the positive electrode current collector and the negative electrode current collector;
a solid electrolyte layer positioned between the positive electrode current collector and the negative electrode current collector; and
an insulating sealing member positioned between the positive electrode current collector and the negative electrode current collector and surrounding the solid electrolyte layer, wherein:
the positive electrode current collector and the negative electrode terminal are electrically isolated from each other with a first gap,
the negative electrode current collector and the positive electrode terminal are electrically isolated from each other with a second gap,
the bipolar current collector is electrically isolated from each of the positive electrode terminal and the negative electrode terminal with a third gap, and
the insulating sealing member fully fills the first, second and third gaps.

* * * * *